United States Patent [19]

Tucker, Jr.

[11] 3,941,903
[45] Mar. 2, 1976

[54] WEAR-RESISTANT BEARING MATERIAL AND A PROCESS FOR MAKING IT

[75] Inventor: Robert C. Tucker, Jr., Indianapolis, Ind.

[73] Assignee: Union Carbide Corporation, New York, N.Y.

[22] Filed: Nov. 17, 1972

[21] Appl. No.: 307,344

[52] U.S. Cl. .............. 427/190; 427/191; 427/225; 427/423; 252/12
[51] Int. Cl.² ................................ B05D 3/02
[58] Field of Search ... 117/22, 46 FS, 105.2, 102 M

[56] References Cited
UNITED STATES PATENTS

| | | | |
|---|---|---|---|
| 2,972,550 | 2/1961 | Pelton | 117/22 |
| 2,998,322 | 8/1961 | Strate | 117/22 |
| 3,071,489 | 1/1963 | Pelton et al. | 117/22 |
| 3,117,845 | 1/1964 | Reed | 117/22 |
| 3,150,938 | 9/1964 | Pelton et al. | 117/22 |
| 3,230,097 | 1/1966 | Fischer | 117/22 |
| 3,298,858 | 1/1967 | Ashikari | 117/22 |
| 3,326,714 | 6/1967 | Rath | 117/22 |
| 3,440,079 | 4/1969 | Jensen | 117/22 |
| 3,556,747 | 1/1971 | Hyde et al. | 117/22 |

*Primary Examiner*—J. Travis Brown
*Attorney, Agent, or Firm*—Dominic J. Terminello

[57] ABSTRACT

A wear-resistant bearing material, and process for making it, comprising hard phase particles, such as $Al_2O_3$, substantially uniformly dispersed in a plasma deposited or detonation gun deposited soft ductile metal matrix, such as aluminum bronze, and wherein said particles are sized between about 0.05 microns and about 100 microns, and present in a volume fraction of between about 3% and 50%.

4 Claims, No Drawings

WEAR-RESISTANT BEARING MATERIAL AND A PROCESS FOR MAKING IT

FIELD OF THE INVENTION

This invention relates to a wear-resistant bearing material and to a method for producing it, said material comprising a plasma sprayed, flame sprayed or detonation gun applied deposit of hard phase particles substantially uniformly dispersed in a soft ductile metal matrix.

BACKGROUND OF THE INVENTION

In theory, bearing materials operating with full-film lubrication should never touch their mating parts. However, under actual operating conditions, bearing materials do, and in some cases must, contact their mating surfaces. Hence, successful use of a bearing material depends on matching its properties to the demands of the application. Performance characteristics of conventional bearing materials include the following:

a. Compatibility — a measure of the antiweld and anti-scoring characteristics of a bearing material when operated with a given mating material. The friction developed at points of contact between the bearing material and its mating part can produce localized welding, thereby causing a seizing or scoring. Thus, a good bearing material will not weld easily to its mating part.

b. Conformability — ability to compensate for misalignment and to conform to other geometric errors. Soft metals with a low modulus of elasticity exhibit excellent conformability characteristics.

c. Embeddability — ability to absorb dirt and foreign particles so as to avoid scoring and wear.

d. Load Capacity — expressed in pounds per square inch, it is a measure of the maximum hydrodynamic pressure which a material can be expected to endure.

e. Fatigue Resistance — ability to perform under load changes without cracking or chipping.

Babbitts (80% to 90% tin, about 3 to 8% copper and 4 to 14% antimony), bronzes and other copper alloys, and aluminum alloys are presently being used as bearing materials to satisfy the widely varying requirements of particular applications. However, when selecting a particular bearing material, the performance characteristics theoretically desired will have to be compromised since no bearing material is equally good with respect to all operating requirements. For example, an aluminum bronze may be chosen for its high load bearing capacity and low wear rate even though it has poor compatibility, embeddability and conformability relative to a leaded bronze, simply because the leaded bronze will not carry a load at all.

Other material used at one time or another as bearing materials include cadmium, silver, cast iron, steel, phenolics (composite materials consisting of cotton fabric, asbestos, or other fillers bonded with phenolic resin), carbon-graphite, rubber, cermets and ceramics. Conventional cermets are composed of a high volume fraction of hard particles (oxides, carbides, etc.), almost always greater than 50% and usually greater than 85%, have a high bulk hardness, are usually brittle and have very poor conformability, impact resistance and embeddability. Thus, cermets are used in bearing applications only when a very precise positioning is required since they are very expensive, difficult to machine, and have to be individually custom produced.

In recent years, plasma deposited, flame sprayed and detonation gun coatings have been used to produce bearing materials and to repair conventional wrought and cast alloy bearings. Not only do these coatings meet the requirements of the original material, but their wear rates have been found to be lower than the conventional materials. The present invention is directed to an improvement over the current generation of plasma deposited, flame sprayed, or detonation gun wear-resistant bearing coatings, and specifically to a bearing material so produced in which hard particles are intentionally added to ductile metal matrices.

SUMMARY OF THE INVENTION

Broadly stated, this invention relates to a process for producing a composite wear-resistant bearing material by depositing, through plasma spraying, flame spraying, or detonation gun techniques, a mixture of hard phase particles, ranging in size between about 0.05 micron and about 100 microns, and wherein said particles are present in a volume fraction of between about 3% and about 50%, with a soft, ductible metal matrix. As used hereinafter, metal is used to mean the elemental metals and metal alloys.

One of the primary attributes of this invention is that it provides a bearing material with excellent wear-resistant characteristics without significantly impeding the embeddability or conformability of the metal matrix. Bearing characteristics can be roughly gauged by the hardness of the overall material, and, since a soft material exhibits better embeddability than a hard material, it is important that the overall or bulk hardness of the composite material not be significantly greater than the matrix material without the hard phase aditives. Hardness can be expressed as a Vickers Hardness Number (VHN), also known as the Diamond Pyramid Hardness value (DPH), as determined in accordance with ASTM Test Method E 92-67. Likewise, the hardness can be expressed as a Rockwell Hardness Number or Rockwell Superficial Hardness Number as determined in accordance with ASTM Test E 18-67. The effect of hard particle inclusions on the hardness of the matrix material can vary because changes in coating parameters can cause significant differences in the hardness of the coating even though the same starting powder is used. Therefore, as used hereinafter, all changes in hardness due to hard particle inclusions will mean the measured hardness with inclusions relative to the hardness of only the matrix as coated with exactly the same coating parameters. Preferably, the inclusion of the hard particles in the bearing metal matrix should not increase the hardness of the bearing material matrix more than about 30% as measured by the Diamond Pyramid Hardness technique using a load of 300 grams. However, when using a matrix material having a relatively low hardness, for example lead, the percent increase in hardness can be substantially higher than 30 percent. All measurements of the matrix material and the particle inclusion material should be made perpendicular to the wear surface. In all bearing applications, the hardness of the particle included matrix material must not exceed a value of about 500 on the Diamond Pyramid Hardness scale (when using a 300 gram load), and preferably should be between 100 and 400. This hardness value will ensure adequate embeddability and conformability.

A common belief exists that hard particles, whether present as inclusions in the bearing alloy or as dirt particles between the bearing surfaces, are detrimental to the performance of such bearing materials. Indeed, one of the characteristics of a good bearing material is embeddability. Nonetheless, it has been found that in accordance with this invention, the addition of hard wear-resistant particles to a soft, ductile plasma-deposited metal matrix will increase the wear resistance while simultaneously decreasing the total system wear rate. These beneficial features are accomplished without significantly increasing the hardness of the material, and thus, the bearing material can still effectively accommodate foreign particles such as dirt and maintain its conformability. The wear-resistant particles for use in this invention should be sized between about 0.05 microns and about 100 microns, preferably between about 0.1 microns and about 50 microns, and should occupy a volume fraction of the bearing material between about 3% and about 50%, preferably between about 5% and about 25%. Various shapes and composition of particles can be successfully used as additives for the bearing material of this invention. Particle sizes smaller than 0.05 microns do not substantially increase the wear resistance of the material, and sizes larger than 100 microns cause excessive wear of the mating surface. Materials with greater than 50% hard particles by volume do have sufficient embeddability and conformability, while those with less than 3% hard particles by volume do not have sufficient wear resistance.

Suitable wear-resistant particles for use in the process of this invention include metal oxides, metal carbides, metal borides, metal nitrides and metal silicides in any combination or mixture thereof. Examples of some metal oxides include such compounds as aluminum oxide, silicon oxide, chromium oxide, hafnium oxide, beryllium oxide, niobium oxide, tantalum oxide, zirconium oxide, calcium oxide, magnesium oxide, yttrium oxide, rare earth oxides, titanium dioxide, and thorium oxide in any and all mixtures including spinels thereof. Suitable metal carbides include silicon carbide, boron carbide, hafnium carbide, niobium carbide, tantalum carbide, titanium carbide, zirconium carbide, molybdenum carbide, cchromium carbide, vanadium carbide, thorium carbide, and tungsten carbide. Suitable metal borides include titanium boride, zirconium boride, niobium boride, molybdenum boride, tungsten boride, tantalum boride, hafnium boride, vanadium boride, and chromium boride. Suitable metal nitrides include silicon nitride, titanium nitride, zirconium nitride, hafnium nitride, vanadium nitride, niobium nitride, boron nitride, tantalum nitride, and chromium nitride. Suitable silicides include molybdenum silicide, tantalum silicide, tungsten silicide, titanium silicide, zirconium silicide, vanadium silicide, niobium silicide, chromium silicide, and boron silicide. These hard particle additives may result in strengthening of the plasma-deposited or detonation gun-deposited material over the base matrix material, thus increasing its load carrying capability. Since the hardness of the base matrix material is preferably increased by not more than 30% due to the particle addition, the conformability and embeddability of the finished bearing material are not adversely affected to any significant degree. Also, since the particles remain as essentially discrete bodies in the bearing material, they have little or no tendency to interact or weld to most metallic or ceramic mating materials in bearing applications and thus they present no compatibility problem.

The overall compatibility of a bearing system, i.e., the bearing material with its contacting mating part, depends primarily on the matrix material of the bearing element. Therefore, although a large number of metal and metal alloys are suitable as the matrix material according to this invention, the optimum choice of the matrix material should be selected as determined by the composition of the mating part in the bearing system, the temperature of operation and the specific lubricant used. In addition, if the bearing material is to be applied as a coating on a substrate, then the composition of the substrate will have to be considered so as to minimize or negate interaction therebetween. When producing composite bodies of the bearing material, then this latter consideration is not necessary. The advantages of using the bearing material of this invention as a coating for a substrate are: (a) a substrate stronger than the bearing material may be used to increase the overall bearing design strength; (b) a bearing surface may be produced directly on a structural component without the need for a separate bearing assembly; (c) the overall weight of a bearing structure may be reduced by using a lightweight substrate such as titanium or aluminum; and (d) the cost of a bearing structure may be reduced by using an inexpensive substrate and a relatively thin coating. In addition, the thickness required for a bearing surface is significantly reduced by the material of this invention because of its superior wear resistance. In fact, the wear resistance of the bearing materials of this invention are comparable to the wear resistance of pure plasma-deposited oxide, carbide or nitride materials, and have the additional advantage in that they can be machined since they are primarily metals.

Suitable materials for use as the matrix of the bearing material of this invention include, but are not limited to, elemental metals such as copper, aluminum, tin, lead, zinc, tungsten, molybdenum, tantalum, hafnium, zirconium, chromium, iron, nickel, cobalt, titanium and the metal base alloys of the above. Copper and tungsten may be desirable for use as electrical contact coatings exhibiting high wear resistance. Molybdenum, tantalum, hafnium, tungsten, and zirconium alloys may be desirable for use in chemically corrosive environments. Any artisan can determine which matrix material and hard particle additive to select once the conditions and operating parameters of the bearing system are known. All that is required is that the quantity of the hard particles and their sizes are as specified above and that the soft, ductile matrix material have the hardness range mentioned.

When the bearing material is to be used as a coating for a solid structural substrate, then some examples of such substrate materials that can be used include, but are not limited to, metals, alloys (such as steel, stainless steel, iron base alloys, aluminum, aluminum base alloys, nickel, nickel base alloys, cobalt, cobalt base alloys, copper, copper base alloys, chromium, chromium base alloys, refractory metals, refractory metal base alloys), carbon, graphite, and plastics including thermoplastic resins and thermosetting resins. The important factor in selecting a substrate is that it should be substantially non-reactant with said bearing material in the end-use environment and maintain its integrity.

The first step in the application of this invention is to select the particular matrix material and hard particle additive suitable for the conditions of an end use bearing system. Preferably, the matrix material should be in the powder form and sized 200 Tyler mesh and finer. A mixture of these components can then be deposited onto a permanent or removable substrate by conventional plasma spraying as disclosed in U.S. Pat. No. 2,858,411 and 3,016,447; or by Detonation-Gun techniques as disclosed in U.S. Pat. Nos. 2,714,563, 2,950,867 and 2,964,420 or by flame spraying as in U.S. Pat. No. 2,861,900. The unique bearing material so deposited will consist of a lamellar structure of interlocking and overlapping microscopic leaves mechanically bonded to each other and to said substrate without substantial alloying at the interface thereof, and will be composed of hard particles intentionally added to the ductile matrix. They are added as discrete particles in such a manner that the wear resistance and strength are increased without significantly increasing the wear of the intended mating surface. If the same amount of hard particles, such as oxides, were present as interlamellar layers, due to oxidation during deposition, then a higher wear rate and lower strength would be expected; a higher wear rate because larger wear particles would be generated and a lower strength because the interlamellar bond would be weakened.

The bearing material of this invention is far superior to conventional materials, even the plasma or detonation gun deposited prior art materials which have been found to exhibit greater wear resistance than conventional wrought or cast materials of the same composition. It is believed that the fine grained, lamellar microstructure of the plasma deposited or detonation gun deposited materials inhibit or localize the size of adhered particles between contacting surfaces during wear; but, whatever the cause, the hard particle inclusions will further enhance the wear resistance of the material even more.

Although this invention is directed to bearing material coatings for applications such as coatings on journals and cylinders, it is also intended to include freestanding structures made entirely of the bearing material as disclosed.

As used herein, a metal base alloy is intended to mean an alloy wherein the base metal is present in the largest proportion by weight and the balance can be composed of one or more adventitious elements, or one or more metals, compounds or intermetallics added to impart mechanical properties.

The following examples are for illustrative purposes only and are not intended to limit the invention in any way.

EXAMPLE 1

The wear and friction characteristics of a series of bearing materials made with one or more of the components shown in Table I were determined.

TABLE I

| Materials | |
| --- | --- |
| AMS 4640 | Wrought Aluminum Bronze |
| LCU-2 | Plasma Deposited Aluminum Bronze (Cu-10 Al wt % Alloy) Sized 325 Tyler mesh and finer |
| LA-6 | Plasma Deposited Aluminum Oxide ($Al_2O_3$) Sized 325 Tyler mesh and finer. |
| Additives | |
| $Al_2O_3$ | Linde B powder ($\gamma\ Al_2O_3$) - Sized 0.05 micron |
| $Al_2O_3$ | Linde C powder ($\alpha Al_2O_3$) - Sized 1.0 micron |
| $Al_2O_3$ | LA-2-400 powder ($\alpha Al_2O_3$) - Sized 37 microns |
| $Cr_2O_3$ | 325 Tyler mesh and finer powder |
| $Cr_2C_3$ | 325 Tyler mesh and finer powder |

Test specimens of the wrought aluminum bronze alloy were cut into "blocks" (described below) from a bar purchased in the heat treated condition [specified as Aerospace Material Specification (AMS) 4640 by the Society of Automotive Engineers]. LCU-2 is a plasma deposited aluminum bronze alloy commercially available from Union Carbide Corporation. Examples of bearing materials that are the subject of this invention were produced by first mixing powders of the LCU-2 alloy with oxides or carbides and then plasma spraying the mixtures on steel substrates ("blocks"). The resulting coated materials were then machined or ground to a final coating thickness of 0.020 inch. The resulting coatings were subject to neutron activation analysis and found to have the compositions shown in columns 1 and 2 of Table II.

The coatings and their wrought counterpart were tested in a commercial wear test machine known as the Dow Corning Alpha Model LFW-1 Wear Testing Machine. The operation and calibration of the machine was done in the manner described in the American Society for Testing and Materials Standard D2714-68. In this test a ring, sized 1.38 inch diameter by 0.34 inch wide, was rotated against a "block", sized 0.25 inch wide, 0.40 inch high, and 0.62 inch long, under a constant load and at a constant speed. In all of the tests described herein, the coatings were applied to metal blocks to a finished thickness of 0.20 inch and the wrought aluminum bronze alloy specimens were cut to the identical size and shape of the coated blocks. The test rings were case hardened 4620 steel ($R_c$ 58-63). A hydraulic fluid, known as Mil H5606A, was used as the lubricant between the block being tested and the ring when the latter was rotated at 180 rpm (a surface speed of 65 ft/min). The test duration was 5400 revolutions (a sliding distance of 1950 ft) under loads of 30, 180 and 450 pounds.

TABLE II

| 1 | 2 | 3 | 4 | 5 | 6 | 7 | 8 | 9 |
| --- | --- | --- | --- | --- | --- | --- | --- | --- |
| Composition | Additive Vol % | Hardness $DPH_{300}$ | Test Load lb | Block Loss Vol, $10^{-6}cm^3$ | Ring Loss Vol, $10^{-6}cm^3$ | Total Loss Vol, $10^{-6}cm^3$ | Final Block Temp °F | Final Coefficient Friction |
| Wrought Aluminum | none | 234 | 30 | 927 | — | 927 | 107 | 0.23 |
| Bronze | | | 180 | 5079 | — | 5079 | 226 | 0.26 |
| Standard LCU-2 | | 243 | 30 | 312 | — | 312 | 105 | 0.14 |
| | | | 180 | 1366 | — | 1366 | 161 | 0.14 |
| | | | 450 | 2840 | — | 2840 | 282 | 0.14 |
| LCU-2 | 17.7 | 166 | 30 | 4.78 | — | 5 | 94 | 0.14 |
| + | | | 180 | 36.7 | 90 | 127 | 142 | 0.14 |
| $Al_2O_3$ | | | 450 | 138 | 492 | 630 | 228 | 0.14 |

TABLE II-continued

| 1 Composition | 2 Additive Vol % | 3 Hardness DPH300 | 4 Test Load lb | 5 Block Loss Vol. 10⁻⁶cm³ | 6 Ring Loss Vol. 10⁻⁶cm³ | 7 Total Loss Vol. 10⁻⁶cm³ | 8 Final Block Temp °F | 9 Final Coefficient Friction |
|---|---|---|---|---|---|---|---|---|
| (0.05 micron size) LCU-2 + Al₂O₃ | 34.5 | 121 | 30 | 5.02 | 82 | 87 | 86 | 0.13 |
| | | | 180 | 29.6 | 215 | 245 | 145 | 0.14 |
| | | | 450 | 114 | 350 | 464 | 239 | 0.14 |
| (0.05 micron size) LCU-2 + Al₂O₃ | 7.26 | 178 | 30 | 7.19 | 150 | 157 | 96 | 0.15 |
| | | | 180 | 30.8 | 175 | 206 | 152 | 0.14 |
| | | | 450 | 152 | 480 | 632 | 247 | 0.14 |
| (1 micron size) LCU-2 + Al₂O₃ | 12.4 | 178 | 180 | 26.2 | 150 | 176 | 149 | 0.16 |
| | | | 450 | 126 | 475 | 601 | 244 | 0.12 |
| (1 micron size) LCU-2 + Al₂O₃ | 21.0 | 190 | 30 | 5.01 | 150 | 155 | 98 | 0.16 |
| | | | 180 | 21.8 | 195 | 217 | 160 | 0.16 |
| | | | 450 | 120 | 515 | 635 | 242 | 0.12 |
| (1 micron size) LCU-2 + Al₂O₃ | 40.5 | 180 | 30 | 2.91 | 40 | 43 | 96 | 0.13 |
| | | | 180 | 18.7 | 145 | 164 | 145 | 0.14 |
| | | | 450 | 67.2 | 390 | 458 | 226 | 0.14 |
| (1 micron size) LCU-2 + Al₂O₃ | 11.7 | 208 | 30 | 2.99 | — | 3 | 96 | 0.15 |
| | | | 180 | 14.4 | 200 | 214 | 156 | 0.14 |
| | | | 450 | 156 | 555 | 711 | 222 | 0.14 |
| (37 micron size) LCU-2 + Al₂O₃ | 40.9 | 206 | 30 | 2.94 | 70 | 73 | 90 | 0.15 |
| | | | 180 | 18.2 | 230 | 248 | 158 | 0.14 |
| | | | 450 | 127 | 675 | 802 | 220 | 0.13 |
| (37 micron size) LCU-2 + Cr₂O₃ | 5.98 | 167 | 30 | 31.8 | 70 | 102 | 95 | 0.15 |
| | | | 180 | 316 | 82 | 398 | 147 | 0.14 |
| | | | 450 | 1400 | 65 | 1460 | 124 | 0.15 |
| (−325 mesh) LCU-2 + Cr₃C₂(−325 mesh) | 17 | 154 | 30 | 10.4 | — | 10 | 89 | 0.13 |
| | | | 180 | 91.4 | — | 91 | 136 | 0.13 |
| | | | 450 | 200 | 225 | 425 | 231 | 0.14 |
| Pure Al₂O₃ (LA-6) (−325 mesh) | — | 700 | 180 | 10.8 | 262 | 273 | 134 | 0.13 |
| | | | 450 | 42.6 | 652 | 695 | 237 | 0.14 |

The results are shown in Table II above and are for the averages of two or more tests at each load (column 4). The final block temperature (column 8) and final coefficient of friction (column 9) were the dynamic values read from a continuous recording of these parameters. The volume losses (columns 5 to 7) were determined from the wear scar areas of the blocks and from weight losses of the rings. No significant losses occurred from the rings in the testing of the wrought aluminum bronze or the plasma-deposited aluminum bronze, LCU-2. In fact, a random gain or loss of approximately 40 × 10⁻⁶cm³ was measured due to the transfer of aluminum bronze to the steel rings and weighing errors, and hence ring losses of this order of magnitude were ignored. The Diamond Hardness value for the test specimens, using a testing load of 300 grams, is shown in column 3 of Table II.

It is readily apparent that the wear rates (column 7) of unmodified LCU-2 are at least an order of magnitude less than that of wrought aluminum bronze. In fact the wrought aluminum bronze material performed so poorly at 450 pound loads that it could not be meaningfully tested. The modified coatings of this invention are yet another order of magnitude lower in wear rates than the standard LCU-2. Even though a loss in material from the rings was measured with the modified bronzes of this invention, the total system loss was still much less than for standard LCU-2 or wrought aluminum bronze.

A comparison of the LCU-2 modified coatings with the plasma-deposited pure alumina coating shows that an additive of as little as 7 vol/o Al₂O₃ produced a bearing material having a much smaller wear rate. If the total system wear (block plus ring) is considered, the materials of this invention produce less total wear than pure alumina. It should be noted that the bearing materials produced according to this invention can be machined with a single point tool whereas pure oxides must be ground. Thus the fabrication and finishing of these bearing materials will be considerably less expensive.

Examination of the data for the various particle sizes of Al₂O₃ additions (Table II) shows a minor sensitivity of the wear rates to this parameter. However, the total system wear at high loads may tend to incrrease at the higher volume fractions with the coarser Al₂O₃ particle sizes. Evaluation of the data for additions of Cr₂O₃ and Cr₂C₂ reveals that a wide variety of hard particles may be used as additives. It is thus obvious that, since the major contribution to wear resistance is due to the hard particles, a wide variety of matrix alloys may be used.

The coefficients of friction (column 9) of the modified materials of this invention are about the same as those of the unmodified plasma-deposited matrix alloys. It should be noted that the plasma-deposited matrix material has a significantly lowe coefficient than its wrought counterpart and that this advantage is not lost by the addition of hard particles.

In addition to increasing the wear resistance of typical plasma-deposited bearing alloys, the addition of hard particles usually results in a stronger material. This was demonstrated by measuring the compressional strength of standard LCU-2 and LCU-2 with a nominal addition of 15 vol/o Al₂O₃ (sized 1 micron). The results measured radially (perpendicular to the coating surface) and longitudinally (in the plane of the coating) are shown in Table III. The specimens, ¼ × ¼ × ½ inch, were cut from free standing cylinders 3 inches high, 3 inches ID, 4⅛ inches OD of bearing material, thus demonstrating as well the possibility of using these materials as solid bearings or inserts as well as coatings.

In spite of this increase in mechanical strength, there is no significant increase in the hardness of these materials (Table II) and hence they should retain the embeddability characteristics of the matrix alloy. Experiments with unmodified beryllium copper alloys have shown that, if necessary to accommodate higher loads with deformation, the hardness and strength of suitable plasma-deposited matrix alloys can be increased by heat treatment without detrimental effects to their wear resistance.

TABLE III

| Coating | Compression Direction | Elastic Modulus, $10^6$ psi | Yield Strength $10^3$ psi | Ultimate Strength $10^3$ psi |
| --- | --- | --- | --- | --- |
| Standard LCU-2 | Longitudinal | 8.4 | 61.5 | 90.8 |
|  | Radial | 7.1 | 57.8 | 95.3 |
| LCU-2+ 15 vol/o $Al_2O_3$ | Longitudinal | 9.7 | 88.9 | 100.7 |
|  | Radial | 8.5 | 73.2 | 124.7 |

EXAMPLE 2

Test block specimens 1 through 7 (column 1), identical to the one in Example 1, were prepared from the materials shown in column 2 in Table IV. The plasma-deposited materials were prepared by mixing 15 vol/o $Al_2O_3$ sized 1 micon, supplied by Union Carbide Corporation and known as Linde C alumina, with unalloyed nickel powder having a particle size of 325 Tyler mesh and finer, or with an aluminum alloy known as 718

TABLE IV

| | Material | Wear Volume | Hardness* $DPH_{30}$ |
| --- | --- | --- | --- |
| 1 | $^1$Al (718) + 15 vol/o $Al_2O_3$ | $5.7 \times 10^{-6}$ cm$^3$ | 127 |
| 2 | $^2$Ni (LN-2) + 15 vol/o $Al_2O_3$ | $9.0 \times 10^{-6}$ | 100 |
| 3 | $^3$LAL-4 | $1355. \times 10^{-6}$ | **130–170 range |
| 4 | $^2$LN-2 | $1213. \times 10^{-6}$ | **150–275 range |
| 5 | $^4$2014-T6 Al | $3460. \times 10^{-6}$ | — |
| 6 | 2014-T6 Al anodized | $2370. \times 10^{-6}$ | — |
| 7 | $^5$7075-T6 Al | $6000. \times 10^{-6}$ | — |

$^1$718 Al has 12 wt/o Si - balance Al - Sized 325 Tyler mesh and finer
$^2$LN-2 has unalloyed Ni - Sized 325 Tyler mesh and finer
$^3$LAL-4 has 12 wt/o Si - balance Al - Sized 200 Tyler mesh and finer
$^4$2014 has 4.4 wt/o Cu - 0.9 Si - 0.8 Mn - 0.5 Mg - bal. Al
$^5$7075 has 2.5 wt/o mg - 0.3 Cr - 5.6 Zn - 1.6 Cu - bal. Al
*All hardness values were measured on cross sections of the coating parallel to the surface.
**Production range of hardness given for commercially available plasma coatings of LAL-4 and LN-2.

having a particle size of 325 Tyler mesh and finer. These mixtures were plasma-deposited on Alpha wear blocks as described in Example 1 and finished to a thickness of 0.006 inch. Similar specimens were prepared with conventional nickel (supplied by Union Carbide Corporation as LN-2) and aluminum (supplied by Union Carbide Corporation as LAL-4) plasma coatings. These coated sample specimens were compared with wrought aluminum alloys designated as 2014-T6, 7075-T6 and anodized 2014-T6 by the Aluminum Association of America. All of these were tested in the Dow Alpha Wear Test Machine, as in Example 1, operating at 180 rpm (65 ft/min) for 5400 revolutions in Mil H5606A, a hydraulic fluid, under a 30 pound load. The results are shown in Table IV. In those instances where the wear scar was very small, the values for a 30 pound load were extrapolated from data of a 180 pound test load. The improvement due to additions of oxides show that the wear rate was greatly decreased.

What is claimed is:

1. A process for producing a wear-resistant bearing material on a solid structural substrate comprising:
   a. preparing a binary mixture consisting of hard phase particles selected from the groups consisting of metal oxides, metal carbides, metal borides, metal nitrides and metal silicides with powders of a metal selected from the group consisting of elemental metal and metal alloys, said hard phase particles being sized between about 0.05 micron and about 100 microns, and present in a volume fraction of between about 3% and about 25%; and said metal powders being sized 200 Tyler mesh and finer; and
   b. depositing said mixture of hard phase particles and metal powders onto a substrate by a technique selected from the group consisting of plasma spraying, flame spraying and detonation gun means, so as to produce a bearing material having a Diamond Pyramid hardness value not exceeding about 500 as tested under a load of 300 grams.

2. The process of claim 1 wherein said powdered metal is selected from the groups consisting of copper, aluminum, titanium, tin, lead, zinc, tungsten, molybdenum, tantalum, hafnium, zirconium, chromium, iron, nickel, cobalt and base alloys of the above metals.

3. The process of claim 1 wherein said hard phase particles are selected from the groups consisting of aluminum oxide, silicon oxide, chromium oxide, hafnium oxide, beryllium oxide, zirconium oxide, calcium oxide, magnesium oxide, yttrium oxide, rare earth oxides, titanium dioxide, thorium oxide, tantalum oxide, niobium oxide and spinel combinations of the above oxides, silicon carbide, boron carbide, hafnium carbide, niobium carbide, tantalum carbide, titanium carbide, zirconium carbide, molybdenum carbide, chromium carbide, vanadium carbide, thorium carbide, tungsten carbide, titanium boride, zirconium boride, niobium boride, molybdenum boride, tungsten boride, tantalum boride, chromium boride, hafnium boride, vanadium boride, boron nitride, silicon nitride, titanium nitride, zirconium nitride, hafnium nitride, vanadium nitride, niobium nitride, tantalum nitride, chromium nitride, molybdenum silicide, tantalum silicide, tungsten silicide, titanium silicide, zirconium silicide, vanadium silicide, niobium silicide, chromium silicide and boron silicide.

4. The process of claim 3 wherein said hard phase particles are selected from the group consisting of aluminum oxide, chromium oxide and chromium carbide; and wherein said metal powder is selected from the group consisting of aluminum base, copper base, and nickel base alloys.

* * * * *